United States Patent Office 2,952,584
Patented Sept. 13, 1960

2,952,584

TREATMENT OF CATTLE

Homer E. Whitmire, Clayton, and Blanton J. Whitmire, Richmond Heights, Mo., assignors to Whitmire Research Laboratories, Inc., St. Louis, Mo., a corporation of Missouri No Drawing. Filed Aug. 21, 1956, Ser. No. 605,414

3 Claims. (Cl. 167—53.2)

This invention relates to animal husbandry and has particular application to the cotnrol in cattle of screw worms, cattle grubs and the like. This application is a continuation-in-part of our co-pending applications, Serial No. 272,708, filed February 20, 1952, and Serial No. 382,012, filed September 23, 1953, both of which are now abandoned.

Larval infestation of cattle is a serious problem. Open wounds on cattle such as those caused by shear cuts, dehorning, dog bites, wire cuts, docking, etc. are subject to screw worm and other secondary blow fly infestations. Other larvae, such as those of Hypoderma bovis and Hypoderma lineatum, appear to work themselves to the backs of cattle from within the cattle, and bore vent holes through the hide. These latter larvae, known as cattle grubs, wolves or warbles, pass through successive instar stages known as first, second, and third instars, progressively enlarging the vent hole, and emerge at maturity.

In controlling larval infestation of open wounds, it has heretofore been the practice to brush or swab the wound with an ointment containing a larvicide such as lindane (the gamma isomer of benzene hexachloride), DDT, diphenylamine, benzene hexachloride, or benzol. Most of these larvicides are toxic, both to animals and to human beings. It has been found difficult and almost impossible to avoid dripping the ointment over uninfested areas when a brush is used. The use of a brush involves the use of an open container, which invites spillage and accidental poisoning. In swabbing a series of animals, the brush or swab is liable to act as a carrier of disease from one animal to another. Furthermore, a wound generally contains very small crevices and broken pieces of skin and flesh. The swab or brush is liable to pack the tissue, cutting off the air from the uninfested tissues and leaving most of the faces of the jagged tissue uncoated.

Many of the ointments known heretofore have used a base which softened with the animal's heat and tended to run off. This is a serious disadvantage, spreading poison to uninfested areas and leaving infested areas without adequate coverage.

In combating cattle grubs, it has been common practice heretofore either to spray the animals copiously with a water base spray, or to dust the animals with a larvicidal powder. Both the sprays and the dusts used for controlling cattle grubs have commonly contained rotenone. The sprays have either been applied by using high pressure streams of sufficient force mechanically to force aside obstructions and to penetrate the cyst opening or by using a low pressure wash from a rake-like device which permits the back of the animal to be scraped with tines from which the spray flows. Neither of these methods permits spot treatment. Both have required large amounts of rotenone because they are wasteful. The use of water base sprays in either of these methods has also suffered from the disadvantage that, during the wintertime, when the grubs are at their most damaging stage, the spray frequently freezes on the animals, resulting in colds. The dust type larvicides known heretofore have had to be scrubbed into the backs of the cattle to break the grub scab and contact the grub.

In both of the types of larval infestation, it has been appreciated that an effective spot treatment was desirable. It has even been proposed to use a spray bomb for grub control, but not only have the efforts of the experts in this field been unavailing heretofore, but such authorities as Roberts, Lofgren and Berndt of the United States Department of Agriculture at the South Dakota Agricultural Experiment Station, writing in the Journal of Economic Entomology, volume 45, No. 6, page 913, say: "The aerosol bomb method of application appears to be unsuited for grub control." A spray method has also been considered in the treatment of larvally infested open wounds. However, as is stated in a United States Department of Agriculture Bulletin, E–813 of February 1951, "The liquid treatment merely poured on or squirted into wounds sometimes fails to kill deeply pocked larvae."

One of the objects of this invention is to provide a larvae destroying composition in a pressure vessel of the aerosol bomb type, and a method of applying the composition by which it penetrates the wound, destroys the larvae, protects the treated surface of the wound, and promotes its healing.

Another object is to provide means by which the larvae destroying medicament is applied easily, safely, and without spreading infestation, to local areas.

Other objects will become apparent to those skilled in the art in the light of the following description.

In accordance with this invention, generally stated, a larvicidal medicament is provided, contained in a pressure vessel, which comprises an ingredient toxic to larvae, a tissue-penetrating liquid, a film-forming material, and a propellant gas which, at least when liquified, is compatible with, i.e., mutually soluble with, absorbable by or adsorbable on one of the constituents of the medicament. It is also desirable that the formulation include a solvent vehicle (in addition to the propellant gas), and a wetting agent.

The preferred larvicidal constituents in those applications in which they are effective are rotenone, rotenoids and cube resins, and white hellebore. The term "cube resins" is used to embrace the resins of other rotenone-containing roots such as derris, timbo, barbasco, Cracca virginiana, etc., as well as cube. The rotenoids and cube resins are exemplified by the product described in United States Patent No. 2,267,385 to Homer E. Whitmire. This material is particularly efficacious, being especially toxic to larvae, serving as a wetting agent and promoting healing of the warm-blood tissue.

Such larvicides as lindane must be used for particular applications, and certain illustrative examples of formulations using lindane and the like are set out below.

The pressure vessel from which the medicament is discharged may be an aerosol bomb of the usual type. However, the spray itself is not a true aerosol as that term is properly defined, in that it contains some particles or droplets of aerosol size, but also larger droplets which serve to provide a heavy residual covering over and around the wound or cyst opening.

The tissue-penetrating liquid is preferably a terpene and preferably constitutes at least twenty percent of the active ingredients.

The film-forming material must be one which forms a gas-permeable covering. This is vitally important. One of the principal mechanisms by which the medicament of the invention is made effective is the boiling of retained propellant gas beneath a film, and its slow but certain release through the film. This gas permeable film also serves to exclude dirt and insects from the wound, but permits the escape of toxic gases which may be generated in the wound by putrefaction of dead tissue or larvae. The use of a gas-impermeable film is not simply unsatisfactory but actually harmful.

The propellant gas should be one which provides a low pressure spray and also is soluble in, absorbable by or adsorbable on another constituent of the medicament to such an extent that a substantial amount, for example ten percent, of the gas is retained by the medicament when it reaches the wound or opening, so that it boils out after the medicament is deposited.

The medicament is simply sprayed from the bomb over the wound or grub cyst opening. No brushing, swabbing or scrubbing is necessary.

The following are illustrative examples of medicament of this invention, the first three being particularly effective against cattle grubs:

I

| Active ingredients: | Percent |
|---|---|
| Rotenone, rotenoids and other cube resins (rotenone .1875%; other cube resins .4375%) | .625 |
| Ethylene glycol ether of pinene | 5.306 |
| Pine oil | 11.556 |
| Camphor oil | 9.434 |
| Polyisobutylphenoxypolyethoxyethanol | 4.717 |
| | 31.638 |
| Inactive ingredients: | |
| Santocel C (silica aerogel) | 5.626 |
| Isopropanol | 15.566 |
| Genetron gas 102J (76% 1,1,1-difluorochloroethane, 16% dichlorodifluoromethane, and 8% trichlorofluoromethane) | 47.170 |
| Total bomb ingredients | 100.000 |

All of the various ingredients except the propellant gas are mixed and placed in a bomb, which is then charged with the propellant gas.

Of the active ingredients, the ethylene glycol ether of pinene, pine oil and camphor oil are terpene tissue-penetrating liquids. The polyisobutylphenoxypolyethoxyethanol is a wetting agent. Of the inactive ingredients, Santocel C is a filming agent, isopropanol is a solvent for the various constituents and Genetron gas 102J is a propellant gas.

Among other terpene tissue-penetrating liquids which may be used, are clove oil, oil of cedar wood, eucalyptus oil, mint oil and thyme oil.

Other propellant gases, such as Freon 11 (trichloromonofluoromethane) and Freon 12 (dichlorodifluoromethane) or a mixture thereof may be used. A 50–50 mixture of Freon 11 and Freon 12 is particularly suitable, liquifying, like Genetron gas 102J, at approximately 35 pounds pressure at 70° F.

Other solvents which are nontoxic to cattle and which do not freeze at normal low temperatures, such as methanol, ethanol, n-propanol, butanol, and the like may also be used.

Other filming agents, such as colloidal magnesium aluminum silicate (known in the trade as Veegum), carboxy methyl cellulose (C.M.C.), methyl cellulose (Methacel), and organophilic bentonite (sold under the trademark "Bentone"), may be used in this and similar formulations.

II

| Active ingredients: | Percent |
|---|---|
| Isopropyl alcohol fluid extract of white hellebore containing one gram per 1 cc. of 3% solids (.075% white hellebore extractives) | 2.50 |
| Pine oil | 10.00 |
| Ethylene glycol ether of pinene | 2.50 |
| Camphor oil | 10.00 |
| Polyethylene 400 monolaurate | 2.50 |
| | 27.50 |
| Inactive ingredients: | |
| Santocel C | 6.00 |
| Isopropanol | 16.50 |
| Genetron gas 102J | 50.00 |
| Total bomb ingredients | 100.00 |

White hellebore extract does not contain any rotenone or rotenoids. Nevertheless, the composition containing it appears to be more effective against cattle grubs in the second instar stage than the composition containing only rotenone, rotenoids and other cube resins. On the other hand, the composition containing rotenone, rotenoids and other cube resins seems to be more effective against cattle grubs in the third instar stage than the composition containing only white hellebore extract.

A composition containing both white hellebore extract and rotenone, rotenoids and other cube resins is particularly effective against the cattle grubs in every instar stage.

An illustrative example of such a composition is as follows:

III

| Active ingredients: | Percent |
|---|---|
| Extract of white hellebore (.06% white hellebore extractives) | 2.000 |
| Rotenone, rotenoids and other cube resins (rotenone .1875%; other cube resins .4375%) | .625 |
| Ethylene glycol ether of pinene | 3.625 |
| Pine oil | 10.250 |
| Camphor oil | 8.000 |
| Polyisobutylphenoxypolyethoxyethanol | 3.000 |
| | 27.500 |
| Inactive ingredients: | |
| Santocel C | 6.000 |
| Isopropanol | 16.500 |
| Genetron gas 102J | 50.000 |
| Total bomb ingredients | 100.000 |

The percentages in the foregoing illustrative examples are by weight.

In applying the larvicide of the first three examples, the bomb is shaken, the hair of the animal to be treated is parted over a grub cyst, and the insecticide is sprayed directly onto the grub opening for one second from a distance of about two inches.

Extensive experiments with the insecticides of this invention have shown that the percentage of grubs killed by treatment therewith compares favorably with and in many cases is greater than the percentage of those killed by treatment with the usual high-pressure wetting sprays and scrubbed-in dusts now in use. At the same time, the amount of rotenone and white hellebore used in the insecticide of these examples per grub treated is markedly less than that of the sprays and dusts commonly used in the prior art.

The larvicides of the following three examples are particularly effective against screw worms.

IV

| | Percent |
|---|---|
| Lindane | 1.8 |
| Pine oil | 21.0 |
| Petroleum sulfonates | 6.0 |
| Mineral oil | 26.4 |
| Silica aerogel | 4.8 |
| | 60.0 |
| Genetron gas 102J | 40.0 |

As with the medicament of Examples I–III, various different terpene tissue penetrating liquids, filming agents and propellant gases may be used.

V

| | |
|---|---|
| Lindane | 1.8 |
| Pine oil | 21.0 |
| Mineral oil | 12.0 |
| Colloidal kaolin | 6.0 |
| Triethanol amine (tech) | 1.8 |
| Stearic acid | 3.6 |
| Water | 13.8 |
| | 60.0 |
| Genetron gas 102J | 40.0 |

It is to be noted that the medicament of this example is water based, and that colloidal kaolin is used as a filming agent. Other filming agents, such as bentonite and talc can be used in place of kaolin.

VI

| | Percent |
|---|---|
| Lindane | 1.800 |
| Rotenone, rotenoids and other cube resins (rotenone .1875%; other cube resins .4375%) | .625 |
| Pine oil | 21.000 |
| Petroleum sulfonates | 6.000 |
| Mineral oil | 25.775 |
| Silica aerogel | 4.800 |
| | 60.000 |
| Genetron gas 102J | 40.000 |

The formulation of Example VI when applied to open wounds not only acts to destroy screw worms and the like, but keeps flies and their larvae from the wound.

The action of the medicament of all of the illustrative examples is the same in that when they are sprayed onto the area to be treated, the liquid retains a considerable amount of propellant gas, which boils out beneath the film which is provided by the film forming agent. For example, it has been determined that the composition of Example IV retains approximately 16% of the charged gas after the medicament has been on a surface at 74° F. for ten minutes. The boiling action of the retained gas, and the increase in pressure drive the medicament deep into the cyst or wound and in and around each jagged piece of tissue. At the same time, because the film is gas-permeable, the pressure does not build up sufficiently to cause damage to the tissue, and the wound is not sealed against the atmospheric air on the one side, and gases generated by the wound or larvae on the other.

Still another advantage of the provision of a gas-permeable film through which the gas can escape slowly is that it confines the fumes of the volatile constituents of the medicaments for a time sufficient to kill larvae, but not to blister. The fumes or vapors of the terpenes are effective. Also, the vapors of such liquids as ethylene dichloride which may be added to any of the formulations of the examples, are toxic or at least irritating to larvae, causing them to move about and contact the larvicidal medicament.

It can be seen that the virtues of the medicament of this invention are not confined to a larvicide. The effectiveness of the boiling out of propellant gas under a gas-permeable film in distributing the medicament can be utilized for applying insecticides, germicides, bactericides, general antiseptics, emollients, and any other kind of drug or medicine which needs to be spread into intimate contact with tissue in open wounds or cysts, or the like. Examples of disinfectants which may be used are alkyl benzyl dimethyl ammonium chlorobenzo mercapto thiazole (around ¼%) and lauryl pyridium chlorobenzo mercapto thiazole (around ¼%). These may simply be substituted for the lindane in the formulae given as examples, to serve as an antiseptic. The term "wound" is used in the appended claims to embrace both open sores, cyst openings and the like.

The term "medicament" is used to embrace any suitable larvicide, insecticide, germicide, bactericide, antiseptic, emollient, medicine or drug.

Having thus described the invention, what is claimed and desired to be secured by Letters Patent is:

1. A manufacture, for use in killing larvae infesting cattle by spraying an infested area of an animal, consisting of a liquified low pressure propellant gas dissolved in a liquid mixture of larvicide and gas-permeable-film-forming agent said film forming agent being silica aerogel, all initially confined within a pressure vessel having a valve which, when opened, delivers a spray of liquid droplets containing at least about 10% of the said liquid propellant gas when said droplets have reached the infested area of an animal being sprayed.

2. The method of killing larvae infesting an open wound or pocket in the flesh of cattle, comprising depositing, by spraying on the infested area of an animal, droplets of liquid containing at least about 10% of a liquified low pressure propellant gas dissolved in a mixture of larvicide and film-forming agent, until the area is covered with liquid; said film-forming agent being such as to produce a film at the exposed surface of the liquid before a substantial amount of the liquified propellant gas has vaporized under the body heat of the animal; said film being of a character such as to permit gas to escape slowly through it when gas pressure is built up behind it by boiling of the volatile constituents of said liquid caused by the body heat of the animal; said build-up pressure substantially simultaneously forcing the larvicide into the wound.

3. The method of treating a wound on cattle, comprising depositing, by spraying on the wound area with a low pressure spray until the wound area is covered with liquid containing at least about 10% of a liquified low pressure propellant gas dissolved in a mixture of medicament and film-forming agent, said film-forming agent being such as to produce a film at the exposed surface of the liquid before a substantial amount of the propellant gas has been vaporized under the body heat of the animal; said film being of a character such as to permit gas to escape slowly through it when gas pressure is built up behind it by boiling of the volatile constituents of said liquid caused by the body heat of the animal; the pressure substantially simultaneously forcing the medicament into the wound.

References Cited in the file of this patent

UNITED STATES PATENTS

| | | |
|---|---|---|
| 2,234,646 | Humphries | Mar. 11, 1941 |
| 2,429,404 | Dixon et al. | Oct. 21, 1947 |
| 2,481,419 | Hamilton | Sept. 6, 1949 |
| 2,524,590 | Boe | Oct. 3, 1950 |
| 2,546,895 | Jarowski | Mar. 27, 1951 |
| 2,621,014 | Efford | Dec. 9, 1952 |
| 2,667,438 | Gardner | Jan. 26, 1954 |
| 2,705,661 | Meissner | Apr. 5, 1955 |
| 2,804,073 | Gallienne et al. | Aug. 27, 1957 |